United States Patent
Beruto et al.

(10) Patent No.: US 10,925,097 B2
(45) Date of Patent: Feb. 16, 2021

(54) METHOD FOR PREVENTING PHYSICAL COLLISION ON ETHERNET MULTIDROP NETWORKS

(71) Applicant: Canova Tech S.r.l., Padua (IT)

(72) Inventors: Piergiorgio Beruto, Genoa (IT); Antonio Orzelli, Genoa (IT)

(73) Assignee: Canova Tech S.r.l., Padua (IT)

( * ) Notice: Subject to any disclaimer, the term of this patent is extended or adjusted under 35 U.S.C. 154(b) by 98 days.

(21) Appl. No.: 15/875,118

(22) Filed: Jan. 19, 2018

(65) Prior Publication Data
US 2019/0230705 A1 Jul. 25, 2019

(51) Int. Cl.
| | | |
|---|---|---|
| H04W 74/08 | (2009.01) | |
| H04J 3/06 | (2006.01) | |
| H04L 12/841 | (2013.01) | |
| H04W 80/02 | (2009.01) | |
| H04W 84/12 | (2009.01) | |

(52) U.S. Cl.
CPC ......... *H04W 74/085* (2013.01); *H04J 3/0652* (2013.01); *H04L 47/28* (2013.01); *H04W 80/02* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,909,717 B1* | 6/2005 | Higgins | ............... | H04L 12/64 370/394 |
| 2005/0111477 A1* | 5/2005 | Ghanma | ............... | H04L 12/413 370/445 |
| 2006/0198389 A1* | 9/2006 | Eriokson | ............... | H04L 47/10 370/466 |
| 2007/0217449 A1* | 9/2007 | Guzikevits | ............ | H04L 12/413 370/468 |
| 2007/0220171 A1* | 9/2007 | Iwamura | ............... | H04B 3/54 709/248 |

(Continued)

OTHER PUBLICATIONS

Piergiorgio Beruto et al., "PHY-Level Collision Avoidance" IEEE802.3cg WG, rev. 1.0, Aug. 2, 2017; 13 pgs.

(Continued)

*Primary Examiner* — Gregory B Sefcheck
*Assistant Examiner* — Suk Jin Kang
(74) *Attorney, Agent, or Firm* — Maier & Maier, PLLC (57) ABSTRACT

A method for avoiding collision over a communication network, wherein devices are connected to the same medium. Each device has an access control module, a transceiver and a data exchange module. The access control module is configured to transmit data to the data exchange module when it receives information that no data is present on the medium. The transceiver is configured to transmit data on the medium each time it receives data from the data exchange module. The data exchange modules of all the devices are synchronized and then offered, in sequence, the opportunity to transmit data on the medium. The opportunity to transmit is offered dynamically after a previous transmission end or, if no transmission occurred, after a predetermined time range has expired. The data exchange module transmits data to the transceiver of the same device only when it is offered the opportunity to transmit.

11 Claims, 8 Drawing Sheets

(56) References Cited

U.S. PATENT DOCUMENTS

| | | | | |
|---|---|---|---|---|
| 2009/0109992 | A1* | 4/2009 | Lurie | H04L 12/40 370/445 |
| 2010/0189126 | A1* | 7/2010 | Lurie | H04W 8/24 370/445 |
| 2011/0021146 | A1* | 1/2011 | Pernu | H04W 88/06 455/41.2 |
| 2011/0222408 | A1* | 9/2011 | Kasslin | H04L 41/083 370/241 |
| 2012/0155289 | A1* | 6/2012 | Cho | H04W 74/0808 370/249 |
| 2013/0329658 | A1* | 12/2013 | Liu | H04W 74/02 370/329 |
| 2014/0334387 | A1* | 11/2014 | Doppler | H04W 74/0816 370/329 |
| 2016/0037553 | A1* | 2/2016 | Attar | H04W 74/04 370/338 |
| 2016/0330751 | A1* | 11/2016 | Benveniste | H04W 56/00 |
| 2017/0078076 | A1* | 3/2017 | Fang | H04L 5/14 |
| 2017/0135130 | A1* | 5/2017 | Seok | H04W 74/06 |
| 2017/0215131 | A1* | 7/2017 | Qi | H04W 76/10 |
| 2017/0347375 | A1* | 11/2017 | Wentink | H04N 21/4126 |
| 2018/0020359 | A1* | 1/2018 | Belghoul | H04L 5/0062 |
| 2018/0020428 | A1* | 1/2018 | Madhavan | H04W 8/22 |
| 2018/0034658 | A1* | 2/2018 | Kinage | H04L 12/40 |
| 2018/0077726 | A1* | 3/2018 | Boger | H04W 74/002 |
| 2018/0167882 | A1* | 6/2018 | Choi | H04W 52/0216 |
| 2018/0176791 | A1* | 6/2018 | Hedayat | H04W 16/14 |
| 2018/0213566 | A1* | 7/2018 | Baron | H04W 72/1242 |
| 2019/0007973 | A1* | 1/2019 | Lou | H04W 72/082 |
| 2019/0014599 | A1* | 1/2019 | Asterjadhi | H04W 72/0446 |
| 2019/0075562 | A1* | 3/2019 | Cariou | H04W 72/0446 |
| 2019/0082358 | A1* | 3/2019 | Asterjadhi | H04W 28/26 |
| 2020/0136857 | A1* | 4/2020 | Yun | H04L 12/40039 |
| 2020/0136993 | A1* | 4/2020 | Yun | H04L 47/826 |

OTHER PUBLICATIONS

Piergiorgio Beruto et al., "PHY-Level Collision Avoidance—Addendum #1" IEEE802.3cg TF, Aug. 16, 2017; 18 pgs.
Piergiorgio Beruto et al., "Phy-Level Collision Avoidance—Addendum #2" IEEE802.3cg TF, Aug. 30, 2017; 24 pgs.
Piergiorgio Beruto et al., "Proposal for short-reach multi-drop 10M SPE (former PLCA)" IEEE802.3cg TF, Sep. 14, 2017; 27 pgs.
Piergiorgio Beruto et al., "Proposal for short-reach PCS and line coding" IEEE802.3cg TF, Oct. 25, 2017; 9 pgs.
Piergiorgio Beruto et al., "Short Reach PCS, PMA and PLCA baseline proposal" IEEE802.3cg TF, Nov. 1, 2017; 28 pgs.
Piergiorgio Beruto et al., "Physical Coding Sublayer (PCS), Physical Medium Attachment (PMA) sublayer and baseband medium, type 10BASE-T1S" IEEE8023, Nov. 6, 2017; 30 pgs.
Piergiorgio Beruto et al., "PLCA overview" IEEE802.3cg TF, Nov. 7, 2017; 23 pgs.
Piergiorgio Beruto et al., "PLCA and TSSI considerations" IEEE802.3cg TF, Nov. 22, 2017; 6 pgs.
Piergiorgio Beruto et al., "T1S baseline amendments" IEEE802.3cg TF, Nov. 22, 2017; 6 pgs.

* cited by examiner

METHOD FOR PREVENTING PHYSICAL COLLISION ON ETHERNET MULTIDROP NETWORKS

TECHNICAL FIELD

The invention relates to methods for transmitting data over communication networks, and in particular over ethernet multidrop networks.

BACKGROUND

IEEE 802.3 Ethernet standard specifies a MAC (Media Access Control) sublayer which is able to support half duplex communication over a multidrop bus, wherein network nodes contend for the use of the physical medium on which transmission is to be carried out.

The MAC sublayer provides for channel access control mechanisms which are known as multiple access protocols. The most widespread multiple access protocol is CSMA/CD (Carrier Sense Multiple Access with Collision Detection) whose algorithm is specified in the standard IEEE 802.3. CSMA/CD essentially provides for detecting physical collisions and, in case of collision, retrying transmission after a random time.

The mechanism specified by CSMA/CD for managing collision on the physical medium, therefore, causes uncertainty on when data transmission will be completed. Eventually, after too many attempts, transmission is discarded. This mechanism therefore can result in large random latencies, as well as reduction of the media aggregate throughput.

This makes plain CSMA/CD approach unsuitable for networks with deterministic requirements such as industrial automation, automotive and most kind of real-time traffic (e.g. audio/video streaming).

The problem of network determinism is currently addressed by several domain-specific solutions, mostly based on TDMA (Time Division Multiple Access) schemes. Nevertheless, also TDMA has drawbacks mainly depending on the fact that devices can only transmit in time slots of fixed length. Unless all nodes of the network use all their time slot to transmit data, which is not realistic, TDMA results in drastically lower throughput compared to Ethernet systems. Besides, if data producers and consumers are not synchronized with the TDMA clock (which is true for most kind of bulk traffic) latencies are also negatively affected.

Furthermore, TDMA based solutions require network engineering, which is a time-consuming operation that often precludes dynamic allocation of the bandwidth, making the system rigid (not plug & play), and affecting overall user experience. Network engineering implies allocation of time slots for each kind of data packet sent over the network by any device. Yet another drawback of TDMA solutions is an overall low throughput due to wasted time slots; the more the system is complex (e.g. if it uses high level protocols such as TCP/IP), the more this effect is important. Other solutions to the problem of network determinism are based on a token ring approach, such as the Profibus® standard IEC61158, and yields similar pros and cons as TDMA in terms of throughput and latency.

A further solution has been proposed by the IEEE 802.1 working group, based on TSN protocols (e.g. 802.1as+ 802.1Qbv). The idea is to achieve very precise time synchronization across the nodes on a network by the means of PTP (Precision Time Protocol), usually with hardware support in the physical layer. A distributed packet scheduler is then used to have network nodes transmitting at prearranged times to avoid collisions. This approach yields fine grained configuration of the access scheme and flexible traffic shaping, but overall complexity is very high and doesn't address the problem of the wasted time slots as for TDMA. Moreover, this solution is mainly software implemented and, therefore, it is not suitable for low cost devices like mid/low-end microcontrollers and embedded systems.

There's therefore the need for a method for managing data transmission over a network which provides certainty of transmission and certainty of the time at which the transmission occurs.

SUMMARY

In one embodiment, the invention is directed to a method for avoiding collision over a communication network, wherein a plurality of devices is connected to one same medium for sending and receiving data. Each device of said plurality is provided with a module for controlling access of the device to the medium, a module for transmitting data over the medium, and a module for exchanging data between the access control module and the transceiver module. The access control module is configured to transmit data to the data exchange module when it receives an information that no data is present on the medium. The transceiver module is configured to transmit data on the medium each time it receives data from the data exchange module. The method provides for synchronizing the data exchange modules of all the devices. Once the data exchange modules are synchronized, the method provides for cyclically offering, in sequence to each data exchange module, an opportunity to transmit data on the medium. This opportunity to transmit is offered dynamically after a previous transmission ends or, if no transmission occurs, after a predetermined time range has expired. Each data exchange module transmits data to a respective transceiver module only when said data exchange module is offered the opportunity to transmit. If a data exchange module receives a request for data transmission from the respective access control module when it has not been offered the opportunity to transmit, then the data exchange module delays data transmission to the transceiver module until the next opportunity to transmit is offered to the same.

This method allows a deterministic transmission of data on an ethernet network, wherein the circuitry implementing the MAC sublayer is configured to try transmission on the medium each time data to be transmitted are available, the Inter-Packet Gap (IPG) period has expired and the lower physical layer reports that the medium is free.

In one embodiment, data exchange module delays data transmission to the transceiver module by buffering a small portion of the data received from the access control module until the device is given its transmit opportunity. If during this time a data exchange module receives from the transceiver module an indication that valid data is received from the medium, the data exchange module:

discards any buffered data received from the access control module, stores an information that the access control module has data to be transmitted, and transmits to the access control module an information that data is present on the medium.

The data exchange module transmits to the access control module an information that no data is present on the medium when the data exchange module detects that it is its turn to transmit data.

In ethernet networks, this solution allows controlling the MAC sublayer by generating on purpose a false information on the medium availability.

In one embodiment, synchronization of the data exchange modules of said plurality of devices comprises the following steps:
(a) a master data exchange module of said plurality of devices sends a beacon signal on the medium via its transceiver module;
(b) when the beacon signal ends, all data exchange modules of said plurality of devices start a transmit opportunity timer which counts said predetermined time range.

According to this solution, therefore, a timer is started by all devices connected to the network after synchronization. This timer allows counting for a predetermined time during which the device to which opportunity for transmitting is offered shall inform all other devices that it intends to transmit data. If said device has no data to transmit at that time, it shall keep silent letting the timer to expire.

Preferably, the master data exchange module sends a beacon signal after no transmissions are ongoing on the medium for a certain amount of time and it receives from the transceiver module an indication that data being present on the medium are not valid data.

In one embodiment, each data exchange module of the devices connected to the network is identified by an identifier, said identifier being an integer ranging from 0 to N-1 where N is the number of devices connected to the medium. Each data exchange module of said plurality of devices comprises a counter which is set to 0 when the beacon signal is received, and which is incremented after a previous transmission end or, if no transmission occurred, after said predetermined time range has expired. In this embodiment, the opportunity to transmit is offered to the data exchange module whose identifier equals the value of the counter. This solution provides a smart, but easy to implement, solution to offer cyclically an opportunity to transmit to the data exchange modules of all the devices connected to the network.

The data exchange module having identifier equal to zero is the master data exchange module which sends a beacon signal each time the counter reaches the value N. This causes all the data exchange modules, including the master, to reset both the transmit opportunity counter and transmit opportunity timer.

In one embodiment the identifier is generated by a management interface controlling the data exchange module.

In another embodiment, the identifier is generated automatically by each data exchange module by sensing on the network how many devices are connected. Preferably, a data exchange module senses how many devices are connected on the network by calculating how many transmission opportunities are offered between two consecutive beacon signals, a transmission opportunity being calculated by the data exchange module each time a valid data transmission is received on the medium, or each time no data is present on the medium for said predetermined time range.

Preferably, in order to allow a device whose identifier is not yet assigned to join a network of N devices without disrupting other devices traffic, the master data exchange module is configured to leave one additional transmit opportunity in addition to those necessary for the N devices to transmit. The said additional transmit opportunity can be used by said device to send an enumeration request to the master data exchange module which upon, successful reception of the enumeration request, in turn increases by one unit a parameter MAX_ID indicating the number of devices connected in the network. In case more than one device at a time needs to join the network, it is possible for the enumeration request to collide with other enumeration requests. In this case the collision is detected and the involved devices will retry sending the enumeration request after a random time. This process converges after some iterations as in CSMA/CD backoff mechanism.

The invention is also directed to a device adapted to implement a method according to the embodiment above briefly summarized, and better detailed in the following description.

In one embodiment, the invention is directed to a device comprising:
an access control module for controlling access of the device to the medium,
a transceiver module for transmitting data over the medium, and
a data exchange module operatively connected to the access control module and to the transceiver module for exchanging data between the access control module and the transceiver module.

The access control module is configured to transmit data to the data exchange module when it receives an information that no data is present on the medium, and wherein the transceiver module is configured to transmit data on the medium each time it receives data from the data exchange module.

The data exchange module is identified by a data exchange module identifier, comprises a transmit opportunity counter and a buffer, and is configured
(i) to increment the counter after receiving an indication that a data transmission has end on the medium, or if no transmission occurred, after a predetermined time range has expired,
(ii) for transmitting said data to be transmitted to the transceiver module only when the data exchange module identifier equals the value of the counter, and
(iii) for buffering said data to be transmitted and delaying their transmission to the transceiver module until the value of the counter equals the data exchange module identifier.

In one embodiment, in response to an indication from the transceiver module that valid data is received form the medium, the data exchange module is further configured to:
discard any buffered data received from the access control module,
store an information that the access control module comprises data to be transmitted, and
transmit to the access control module an information that data is present on the medium,
and wherein the data exchange module is further configured to transmit to the access control module an information that no data is present on the medium when the data exchange module identifier equals the value of the counter.

These and other advantages and aspects of the present invention will become clear and more readily appreciated from the following detailed description of the invention taken in conjunction with the accompanying drawings.

BRIEF DESCRIPTION OF THE DRAWINGS

The invention will be described below with reference to some not limitative examples, provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION

While the invention is susceptible to various modifications and alternative constructions, some preferred embodiments are shown in the drawings and will be described in detail herein below.

It should be understood, however, that there is no intention to limit the invention to the specific disclosed embodiment but, on the contrary, the invention intends to cover all modifications, alternative constructions and equivalents that fall within the scope of the invention as defined in the claims.

The use of "for example", "etc.", "or" indicates non-exclusive alternatives without limitation, unless otherwise defined.

The use of "includes" means "includes, but not limited to", unless otherwise defined.

In the following description, signals and functions which are defined in IEEE Standard 802.3, like PLS (Physical Layer Signaling) data and commands, will be used in this specification with the meaning of the standard specification unless differently indicated.

Figure 1:
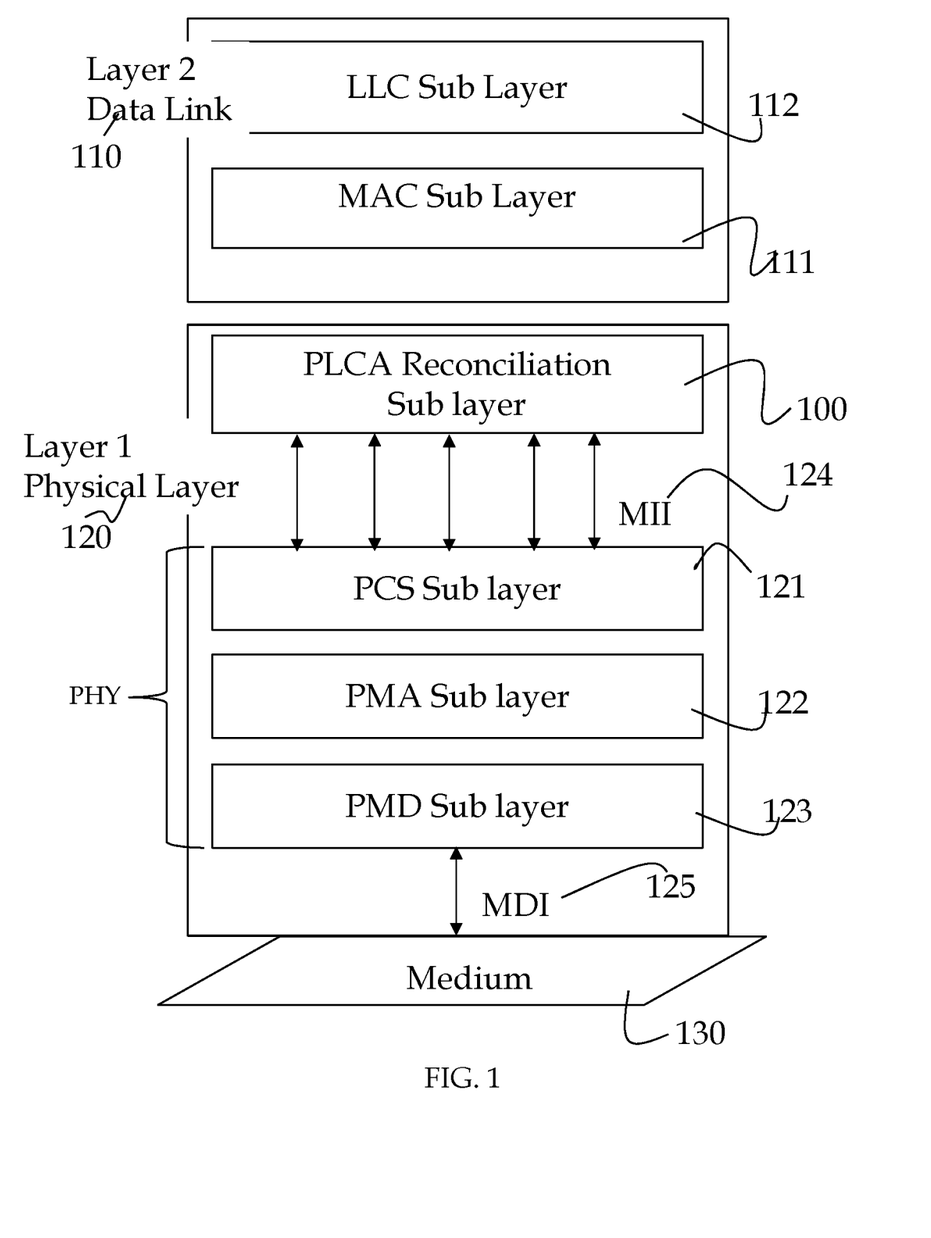
FIG. 1 illustrates modification of the invention to the OSI model.

FIG. 1 illustrates modifications brought by the invention to the set of Ethernet protocols. The invention introduces a new sublayer 100, called Physical Layer Collision Avoidance Reconciliation Sublayer (shortened PLCA RS), within Layer 1 of the OSI model.

Layer 1, or Physical Layer, 120 is responsible for establishing, maintaining and ending physical connections (point to multipoint) between computer stations connected to the same medium 130. Physical Layer 120 comprises the new Reconciliation Sublayer 100 and a group (in the following shortened PHY) of three additional sublayers: PCS sublayer 121, PMA (Physical Medium Attachment) sublayer 122 and PMD (Physical Medium Dependent) sublayer 123. PCS, in particular, is responsible for encoding data which are received by the MAC sublayer 111 via the Reconciliation Sublayer (RS) and the Media Independent Interface (MII) 124, and vice versa to decode data received via the PMA sublayer and intended for the MAC sublayer 111. PMD sublayer is the lower layer which is connected to the medium via the MDI interface 125.

Together with the Logical Link Control (LLC) Sublayer 112, the MAC sublayer 111 is part of the OSI model Layer 2 or Data Link 110. This layer provides the functional and procedural means for exchanging data between network nodes. They are therefore responsible for organizing the data into frames and adding error checking and addressing information. MAC sublayer, in particular, implements multiple access protocols, like CSMA/CD for collision detection and re-transmission in Ethernet bus networks.

Modifications to the Ethernet protocols described here below aim at creating transmit opportunities at proper times across a multi-drop network in order to avoid physical collisions on the medium.

Figure 2:
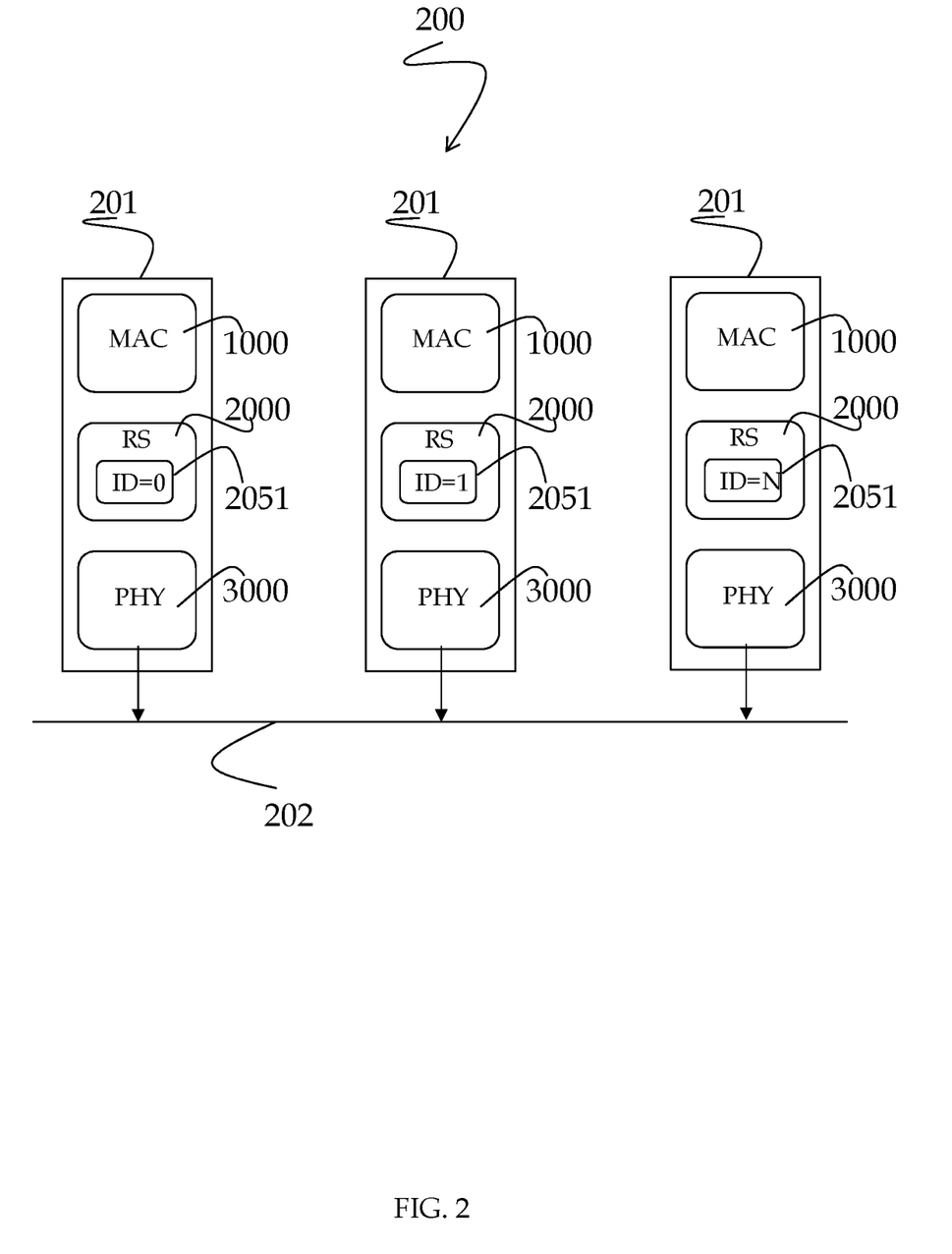
FIG. 2 illustrate a computer network comprising devices provided with a PLCA function according to the invention.

An example of multidrop network 200 is illustrated in FIG. 2, wherein a plurality of devices 201 exchange data over a medium 202, e.g. a twisted pair cable or an optical cable. Devices 201 can be any type of computer devices which are able to connect to the medium. As an example, network 200 can be a network of sensors and actuators within a car, therefore devices 201 can be a power train control module, a throttle sensor, a manifold absolute pressure sensor, a mass air flow sensor, and the like.

As illustrated in FIG. 2, each device 201 is provided with an access control module 1000 for controlling access of the device to the medium, a transceiver module 3000 for transmitting data over the medium, and a data exchange module 2000 for exchanging data between the access control module and the transceiver module. The access control module 1000, also shortened MAC module, implements the functions of the MAC sublayer and is configured to transmit data to the data exchange module when it receives an information that no data is present on the medium. The transceiver module 3000 implements the functions of the PHY sublayers and is configured to transmit data on the medium each time it receives data from the data exchange module.

The data exchange module 2000 implements the functions of the PLCA Reconciliation Sublayer; in the following description it will therefore be also called RS module 2000. RS module 2000 maps the signals provided at the MII to the Physical Layer Signaling (PLS) service primitives defined in IEEE 802.3 via the PLCA state machines, variables and functions that will be described below.

Figure 3:
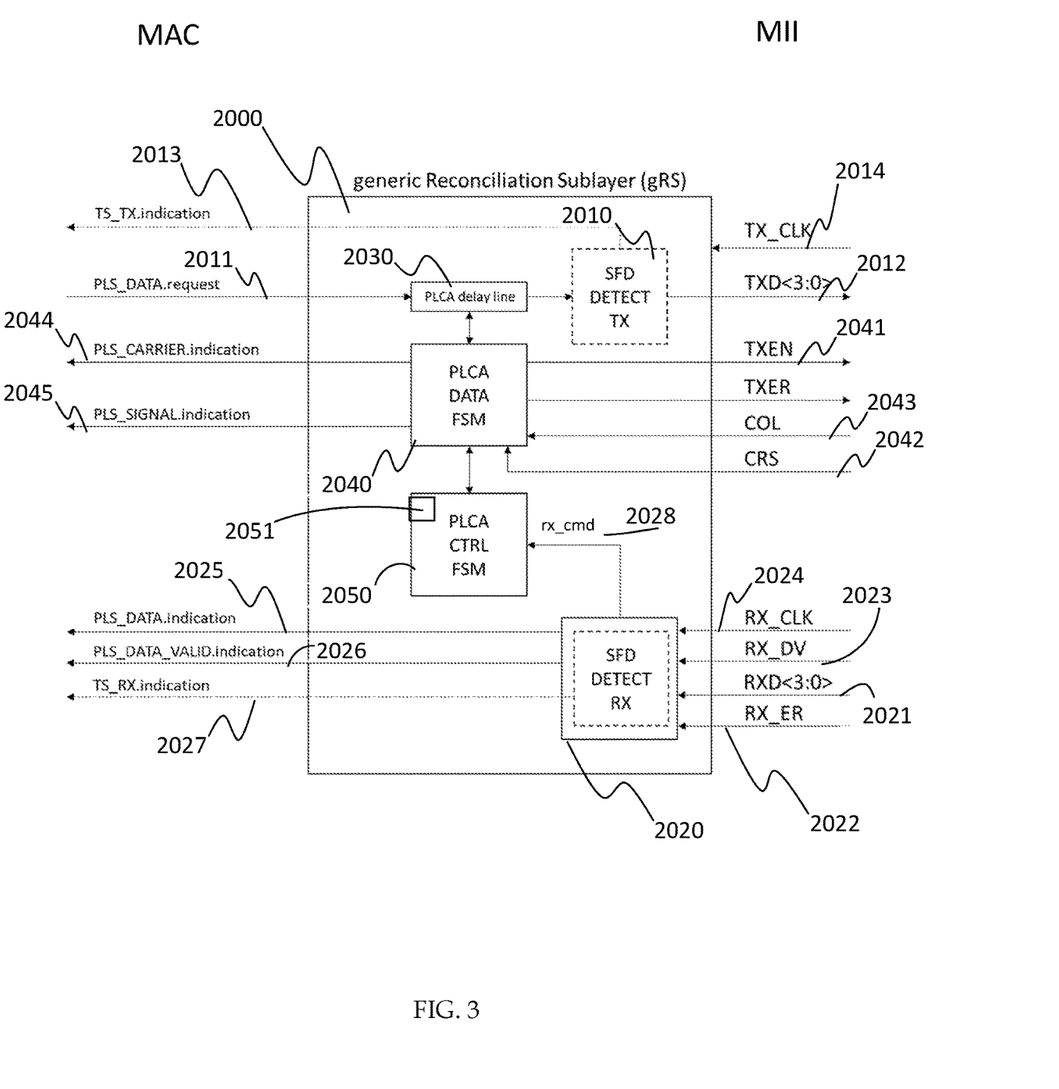
FIG. 3 schematically illustrates a module provided within each of the devices of FIG. 2.

RS module 2000 comprises a PLCA delay line module 2030, a PLCA Data module 2040 and a PLCA Control module 2050.

RS module 2000 optionally comprises a SFD Detect TX module 2010 and SFD Detect RX module 2020 when TSSI (Time Synchronization Service Interface) features are desired to support protocols that require knowledge of packet egress and ingress time.

The TS_TX.indication and TS_RX.indication primitives (indicated in FIG. 3 by reference numbers 2013 and 2027 respectively) are decoded by the respective SFD detect blocks. TSSI is standardized in clause 90 of the IEEE 802.3 specifications. If both TSSI and PLCA features are adopted in a PHY Reconciliation Sublayer, the SFD Detect TX module shall be implemented in between the PLCA delay line and the MH interface to have time synchronization protocols work as intended.

Data conveyed from the MAC module to the RS module 2000 via the PLS_DATA.request primitive 2011 is held within the PLCA delay line until either a transmit opportunity is offered to the RS module (as explained here below) or the MAC module is forced to perform a backoff.

When allowed by the Finite State Machine implemented by the PLCA Data module, data is retrieved from the PLCA delay line and conveyed to the PHY via the TXD 2012, TXEN 2041 and TX_CLK 2014 MII interface signals, described in clause 22 of the IEEE802.3 specifications.

The PLCA Data module 2040 decodes CRS (2042) and COL (2043) indications from the MII along with the indications provided by the Finite State Machine implemented by PLCA Control module 2050 to convey commands to the MAC sublayer via the PLS_CARRIER.indication (2044) and PLS_SIGNAL.indication (2045) primitives. CRS and COL are MII signals described in clause 22 of IEEE802.3 specifications.

PLCA Control Fine State Machine decodes the rx_cmd variable (2028) from the MII signals RXD (2021), RX_ER (2022), RX_DV (2023) and RX_CLK (2024) as defined in clause 22 of the IEEE802.3 specifications. The PLS_DATA.indication (2025) and PLS_DATA_VALID.indication (2026) primitives are decoded from the same MII signals as specified in IEEE802.3 specifications.

Module 2050 stores in a memory area an identifier called myID (2051) identifying the RS module 2000.

In one embodiment, myID 2051 is an integer value, which is generated by the management interface controlling the Physical Layer Circuitry (in the following shortened as PHY), and represents the PLCA transmit opportunity ID assigned to the RS module 2000. Different devices connected in the same network have different myID assigned. myIDs are assigned progressively, therefore if N devices are connected in the network, they will be assigned myID values from 0 to N−1. If one of the devices should disconnect, e.g. for a failure, then in one embodiment myIDs are not regenerated, but reassignment of myIDs to all devices is also possible in case of failure of one of the devices.

Alternatively, myIDs 2051 can be generated automatically by module 2050 by sensing on the network how many devices are connected.

According to the proposed method, in order to avoid collision, each device is allowed to transmit data only in given time instants; to this aim, each device is also provided with a counter, called curID, which is incremented each time a device 201 on the network has terminated its transmission turn.

Figure 4:
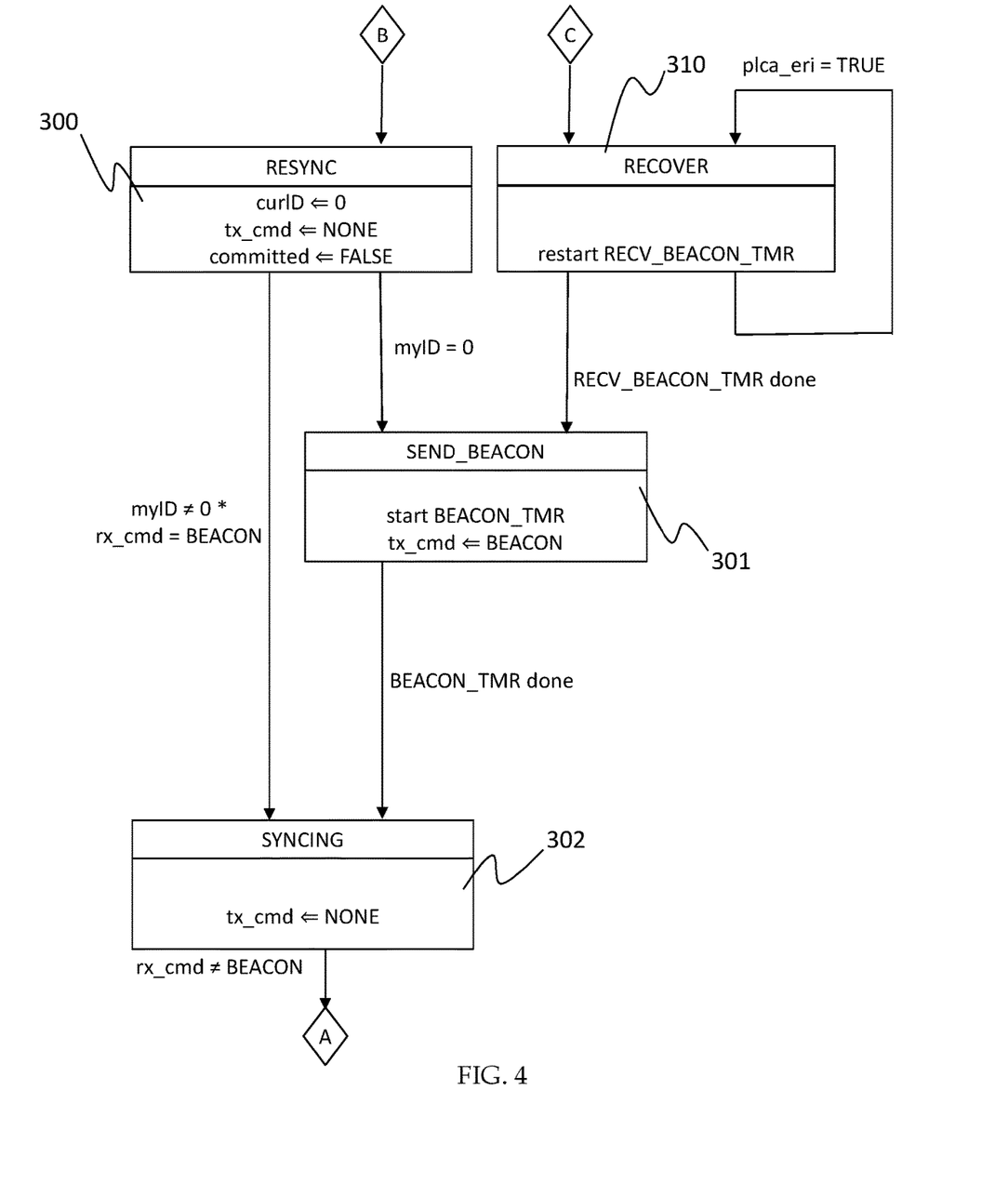
FIG. 4 illustrates a first portion of a state diagram for the PLCA control function.

Operatively, all the devices' PLCA Control Finite State Machines are initially in a state 300 called RESYNC, wherein the curID of each device is set to zero.

The device having myID=0 moves to the successive state 301 and, acting as a master device, sends on the network a BEACON signal for a predetermined period of time. A timer called BEACON_TMR is therefore started by the master device and transmission of the BEACON signal is terminated at the end of this timer.

The BEACON signal is used for synchronization of all the RS modules, therefore all the other RS modules having myID different from zero, stands in state 300 listening for data on the network and, on reception of the BEACON signal, they move to a synchronization state 302. In the synchronization state 302, RS modules 2000, including the master, wait for the end of the BEACON signal.

Once reception of the BEACON signal ends, all the RS modules enter a further state 303 (called WAIT_TO), wherein each of them waits for its transmission opportunity. Each RS module, therefore, starts a counter called TO_TIMER which counts for a predetermined period of time which is preferably lower than 100 bit times, and preferably equal to 20 bit times.

At this point, only the RS module having myID equal to curID has the opportunity to transmit data on the network. For sake of simplicity, this RS module will be called active RS module, while the other RS modules will be called passive RS modules.

The active RS module checks if the MAC module 1000 of the same device has data to be transmitted on the network, and, based on that, moves to a different state. To this end, each RS module stores the value of a variable, called framePending, which indicates if the MAC module has data ready to be transmitted or not. framePending is an internal variable used to synchronize PLCA Control and Data functions. The PLCA Data finite state machine implemented by module 2040 sets this variable when it detects the MAC module is ready to send a packet and have PLCA Control finite state machine (implemented by module 2050) actually commit for the next available transmit opportunity.

If there are no data to be transmitted the active RS module moves to the YIELD state 304 waiting for TO_TIMER to elapse. Meanwhile, passive RS modules are still in the WAIT_TO state.

When TO_TIMER elapses, then all the RS modules move, either from state 304 or from state 303, to the NETX_TS state 305 and increment the value of the counter curID of one unit. If the incremented curID on the master RS module has reached a value MAX_ID, equal to the number of devices 201, the master RS resets its own curID and moves back to state 300 to send a new beacon. On reception of said beacon signal the slave RS modules moves from WAIT_TO state to state 307 then to state 300, resetting their own curID counters.

From WAIT_TO state, if the framePending variable is set to TRUE, the RS module having an opportunity to transmit moves to the COMMIT state 306. In this state, the active RS module stops TO_TIMER and informs all the passive devices that it intends to send data. This is done by broadcasting a COMMIT signal over the network.

Additionally, PLCA Control module 2050 informs the PLCA Data module 2040 that it is ready to transmit data, this is done by setting the variable COMMITTED to the value TRUE.

After transmitting the COMMIT signal, module 2050 waits for the FSM implemented by module 2040 to enable transmission. Module 2040 enables transmission by asserting the primitive PLS_CARRIER.indication(CARRIER_OFF) which causes the MAC module to respond with a PLS_DATA.request primitive after the Inter-Packet Gap period (IPG) is elapsed. The PLS_DATA.request primitive asserts the plca_txen variable causing module 2040 to set the MII signal TX_EN to TRUE.

When variable TX_EN is set to TRUE, the active RS module moves to a TRANSMIT state 307 and starts transmitting data over the network.

Figure 5:
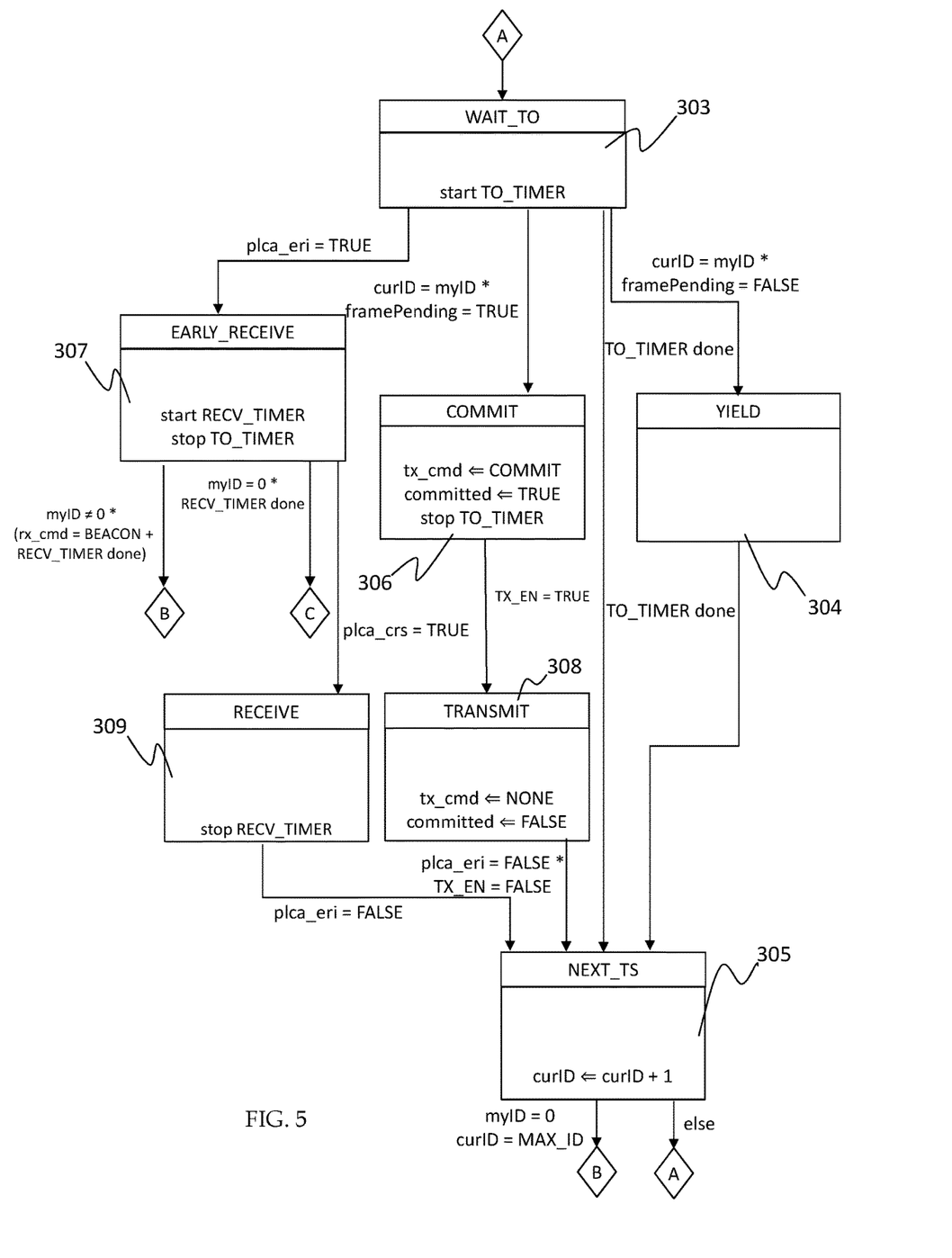
FIG. 5 illustrates a second portion of a state diagram for the PLCA control function.

When PLCA Data module 2040 sets the variable TX_EN to FALSE, meaning that all data have been transmitted, the active device moves to the NEXT_TS state 305 to increment the counter curID. Preferably, as indicated in FIG. 5, PLCA control module 2050 of the active device stands in the TRANSMIT state 308 until two conditions are fulfilled: (i) TX_EN is set to FALSE, and therefore there are no data to be transmitted, and (ii) there are no data on the medium. This second condition is sensed by the PLCA control module 2050 by checking the variable plca_eri, which is set to TRUE as soon as data is present on the medium. In the preferred embodiment, therefore, module 2050 of the active device stands in the TRANSMIT state until TX_EN=FALSE and plca_eri=FALSE. In this way, after transmission of all data on the medium, the active RS module waits, until no more data is sensed on the medium, before incrementing the CurID and resetting the TO_TIMER (states 304 and 303). This allows for minimizing the transmit opportunity timer skew among the devices compensating for PHY TX and RX latencies.

As soon as the active RS module starts sending the COMMIT signal, passive RS modules sense that data is present on the network. Variable plca_eri is therefore set to TRUE and the PLCA control module 2050 of the passive RS modules moves to a pre-receiving state 307, called EARLY_RECEIVE, wherein TO_TIMER is stopped and a new timer called RECV_TIMER is started. In this state, passive RS modules wait for reception of a valid data transmission on the medium. If a valid start frame delimiter is found on the medium (variable plca_crs is set to TRUE) before the RECV_TIMER has elapsed, passive RS modules moves to the receiving state 309.

In the receiving state 309, passive RS modules stop the RECV_TIMER and receive data that are on the medium. Reception is continued until variable plca_eri is set to FALSE, i.e. until there are no data on the medium. When no data is available on the network, PLCA control module 2050 of the passive RS modules moves to NEXT_TS state 305.

If a PLCA control module 2050 is in the EARLY_RECEIVE state 307, but, it does not receive a valid start frame delimiter before the RECV_TIMER has elapsed, then the finite state machine implemented by control module 2050 moves to a different state depending on it is the master RS module (myID=0) or not.

If the RS module that does not receive a valid start frame delimiter is not the master RS module, then it moves to the RESYNC state 300, thereby waiting for reception of the BEACON signal and forfeiting its transmit opportunity. The reason for moving to this state, is that if no valid SFD has been received, then this means that the RS module is probably not synchronized and therefore is not in the position to correctly assess when it is its transmitting opportunity. In the RESYNC state 300 the device will be able to receive data, but not to transmit.

If the device that does not receive a valid start frame delimiter is the master RS module, then it moves to the RECOVER state 310 which is maintained for a certain amount of time given by the timer RECV_BEACON_TMR. To ensure the beacon is not sent while passive RS are still transmitting or receiving data, the RECV_BEACON_TMR is reset each time any transmission is detected on the medium.

When RECV_BEACON_TMR elapses, the master RS module moves to the SEND_BEACON state 301 in order to resynchronize all the RS modules as explained before.

From the above description, it is clear how the PLCA control module 2050 implements control functions of a device by enabling, delaying or stopping data transmission on the medium based on the transmission opportunity which is offered in turn to each device connected to the network.

Nevertheless, according to the Ethernet protocols, a MAC sublayer tries to send data as soon as it receives instructions from the higher layers. In order not to modify the MAC sublayer, as described above, the reconciliation sublayer (implemented by module 2000) must be able to manage transmission requests from the MAC in order to transmit data not randomly, but only when a transmission opportunity, i.e. when myID=CurID, is given to the device.

Besides, the MAC module has no specific means to directly notify the RS module of a condition wherein data is available to be transmitted or not. Therefore, the RS shall detect said condition on its own by observing the other signals driven by the MAC and deducing internal states accordingly.

Data module 2040 plays an important role in reaching these goals. The state diagram of the FSM implemented by data module 2040 is described in FIGS. 6 and 7.

Figure 6:
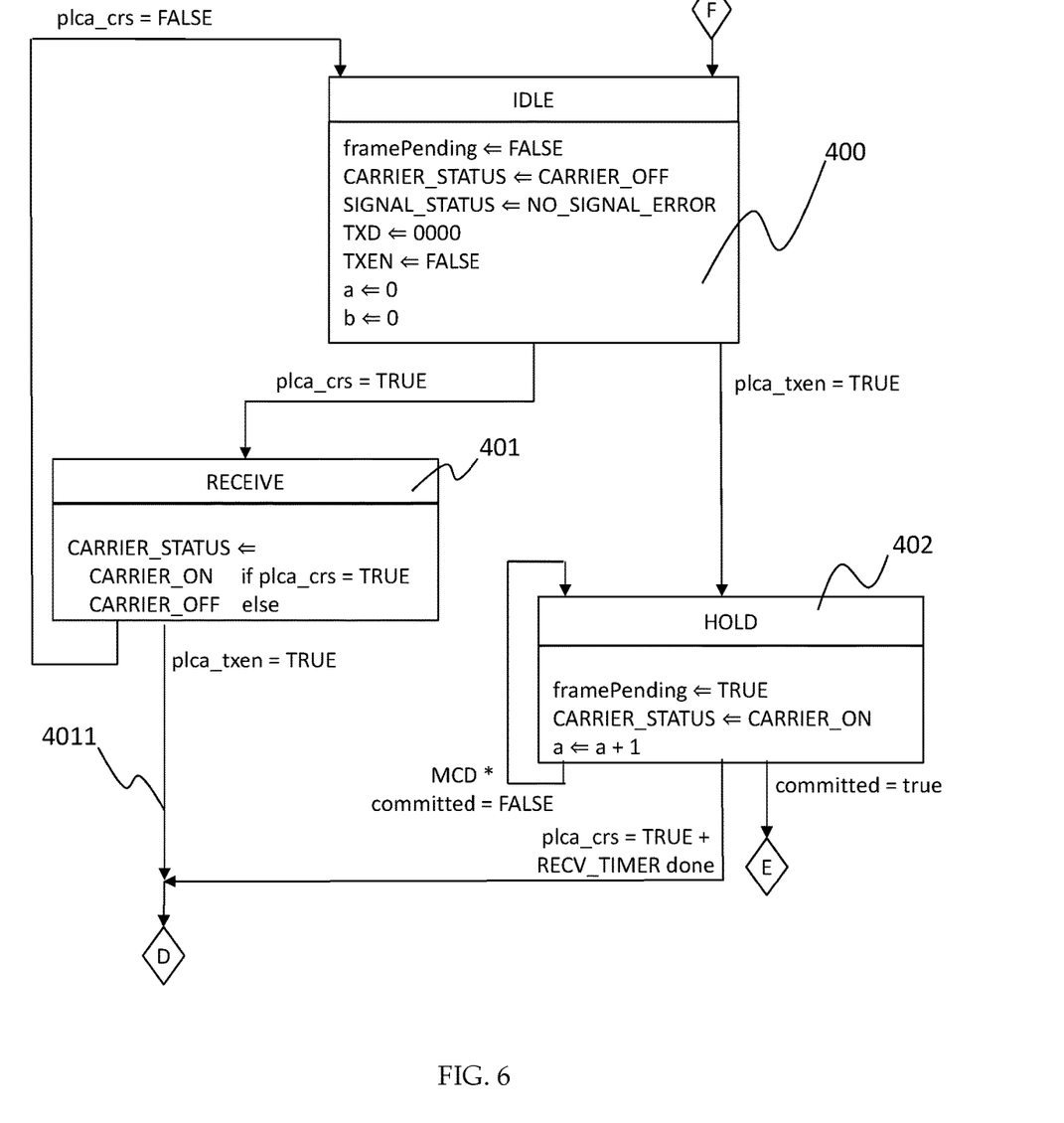
FIG. 6 illustrates a first portion of a state diagram for the PLCA data management function.

If the MAC module 1000 does not provide data to be transmitted to the RS module 2000, the data module 2050 is in IDLE mode 400. In this mode the framePending variable and the TX_EN parameter are set to FALSE, so as to indicate to the control module 2050 that there are no data from the MAC module ready to be transmitted, and that no transmission has to take place. Therefore, also if the control module 2050 senses that there's an opportunity to transmit because curID=myID, then no transmission will take place as described above.

In IDLE state, the CARRIER_STATUS parameter is set to CARRIER_OFF and the SIGNAL_STATUS parameter is set to NO_SIGNAL_ERROR. In this way the RS module informs the MAC module of the idle state (i.e. allows the MAC to initiate a data trans mission).

When RS module 2000 receives valid data from the MII (i.e. the parameter plca_crs is set to TRUE), the data module 2040 moves to the receiving state 401. In this state the data module 2050 sets the CARRIER_STATUS to CARRIER_ON if plca_crs is TRUE; when plca_crs is set to FALSE, because there are no more data to be received, then data module 2040 sets the CARRIER_STATUS to CARRIER_OFF and moves back to the IDLE state.

Figure 7:
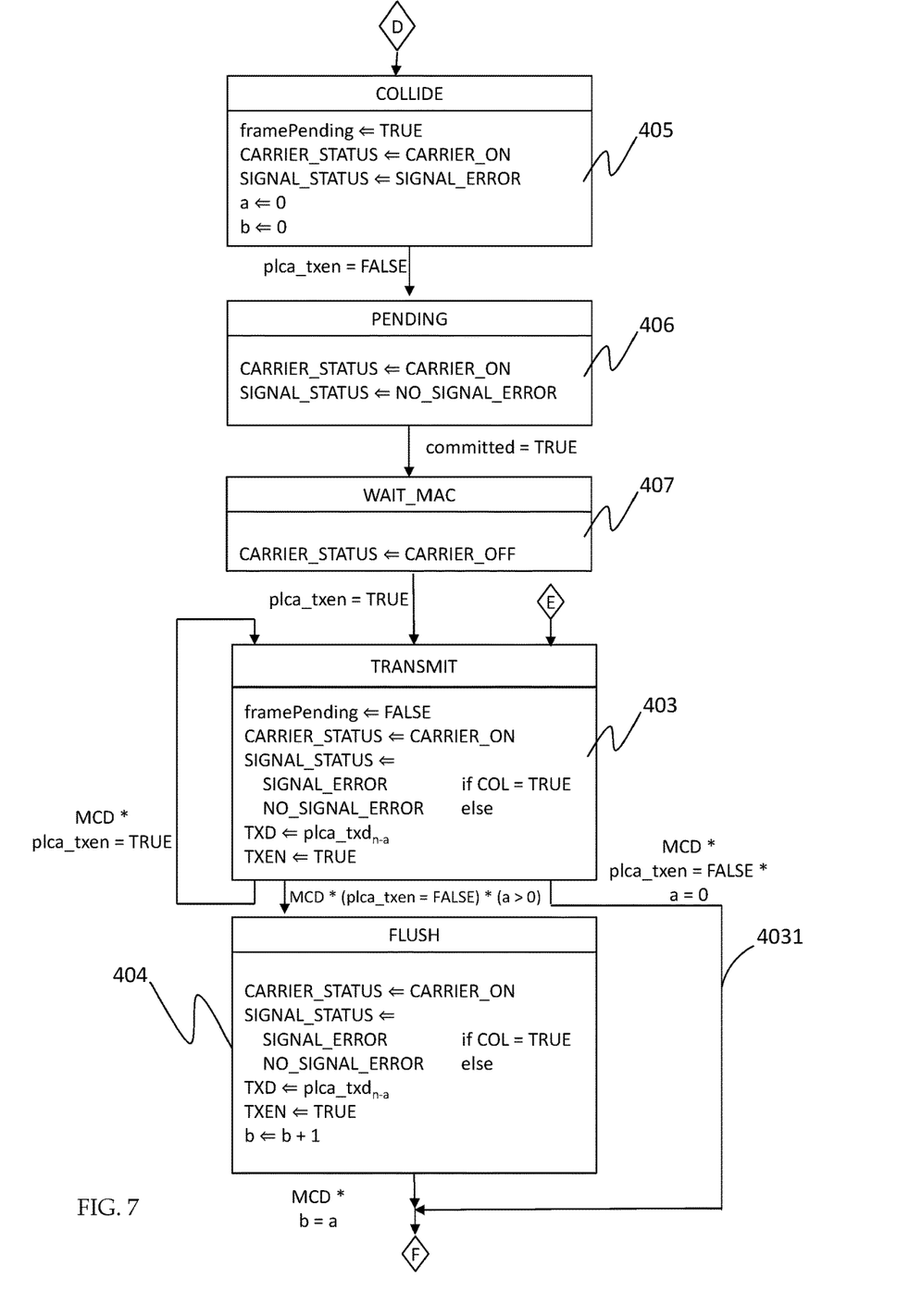
FIG. 7 illustrates a second portion of a state diagram for the PLCA data management function.
Figure 8A:
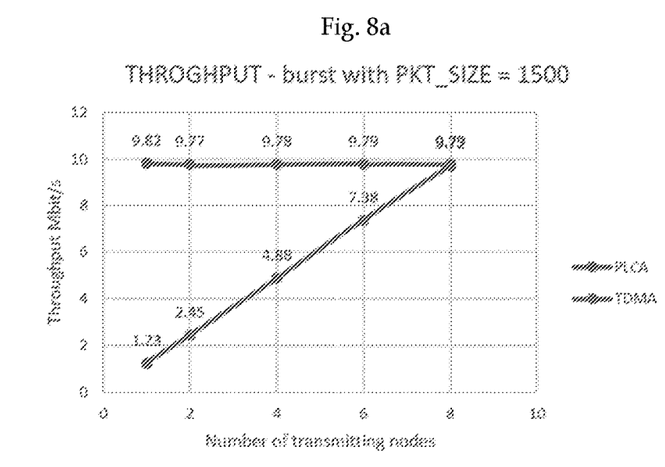
FIG. 8a illustrates performance comparison between PLCA and TDMA based network.
Figure 8B:
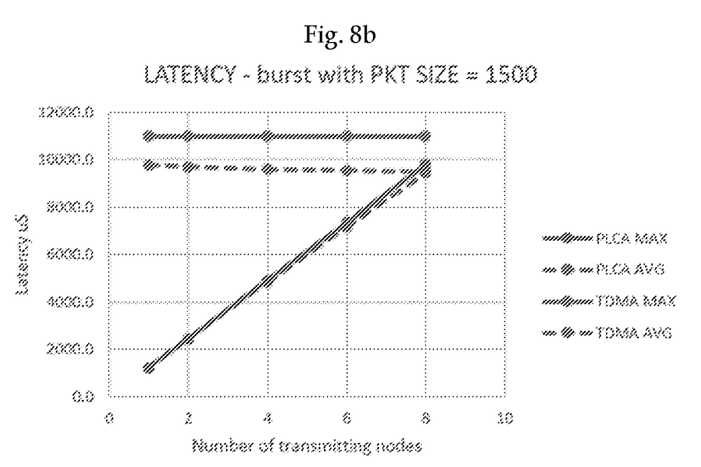
FIG. 8b illustrates performance comparison between PLCA and TDMA based network.
Figure 8C:
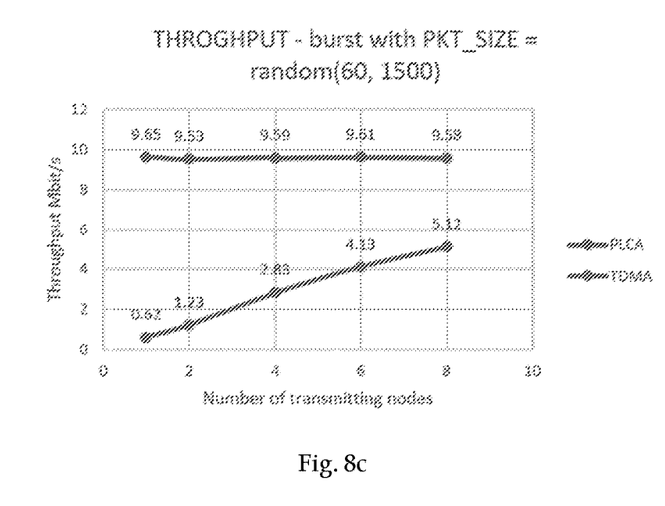
FIG. 8c illustrates performance comparison between PLCA and TDMA based network.
Figure 8D:
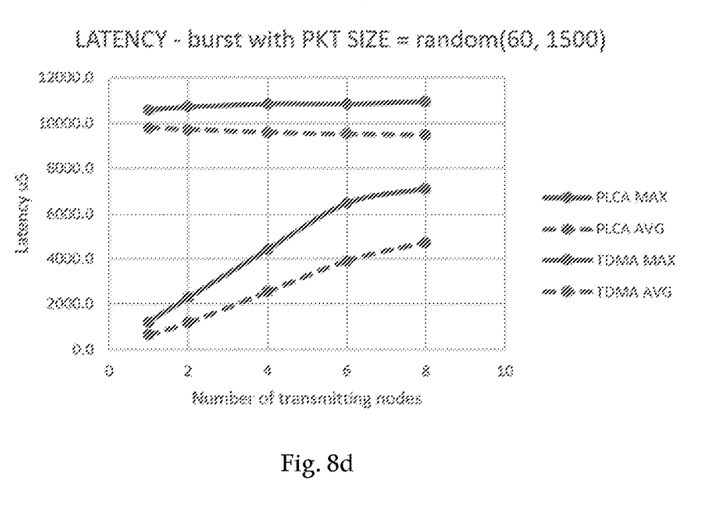
FIG. 8d illustrates performance comparison between PLCA and TDMA based network.

If the PLCA delay module 2030 receives a PLS_DATA.request set to 1 or 0, i.e. if the MAC module indicates that a bit must be transmitted, the plca_txen parameter is set to TRUE. If there are no data on the medium (plca_crs=FALSE), then the FSM of the data module 2040 moves from the IDLE state 400 to a HOLD state 402 wherein data from the MAC are buffered. In FIG. 7, buffering is indicated by increasing of the buffer index 'a' (a=a+1) at each MH clock period. The CARRIER_STATUS is set o CARRIER_ON and the framePending parameter is set to TRUE.

If the control module 2050 sets the COMMITTED parameter to TRUE while the data module FSM is in the HOLD states, the data module 2040 moves to a TRANSMIT state 403.

Data module therefore provides to the MII all the necessary commands to transmit data taken from the buffer.

When data module 2040 is in the TRANSMIT state 403, it is possible that the MAC has not yet provided all the data to the RS module, therefore at each MII clock period (indicated as MCD in FIG. 7), four bits are added in the buffer, and four are taken from the buffer and transmitted. When the MAC module ends transmitting data to the RS module, then the buffer can still hold some data to be transmitted, therefore the FSM of the data module 2040 moves to a FLUSH state 404 wherein the buffer is emptied and all data transmitted.

While in the TRANSMIT or in the FLUSH state, the TX_EN parameter is set to TRUE, in order to inform the control module 2050 that transmission continues and have the transmit module to put data on the medium. In these states, the data module 2040 communicates with the MAC keeping the SIGNAL_STATUS parameter to the value NO_SIGNAL_ERROR unless a collision, signaled by the MII by setting the COL parameter to TRUE, is detected. Note that the said condition is not supposed to occur when PLCA is properly configured and it's only needed to handle misconfiguration errors (e.g. adding a node not supporting PLCA on the network).

Another possibility is that while the data module 2040 is in the HOLD state 402 and it is buffering, another device of the network, with different myID, starts transmitting and the RS module 2000 start receiving a valid SFD (plca_crs=TRUE). In this case, it could happen that the data module 2040 is required to buffer up to 1528 byte for each device, i.e. the maximum size of an ethernet frame including the preamble.

In the preferred embodiment, which allows reducing the buffer size, the data module 2040 moves to a COLLIDE state 405, wherein a logical collision is generated.

In the COLLIDE state, the data module 2040 informs the MAC of a collision which, actually, has not happened and which has not been signaled by the transceiver module 3000 implementing the functions of the PHY sublayers. This collision is therefore a logical collision that is generated only to let the MAC module backoff. In order to generate the logical collision, data module 2040 sets the SIGNAL_STATUS to SIGNAL_ERROR and the CARRIER_STATUS to CARRIER_ON. At the same time, the framePending parameter is set to TRUE, in order to book transmission at the next transmission opportunity. The buffer is then erased or, more simply, the buffer indexes 'a' and 'b' (respectively for writing and reading the buffer) are set to zero.

By receiving the updated SIGNAL_STATUS and CARRIER_STATUS parameters, the MAC therefore makes backoff, i.e. waits for a time period equal to 512*K— wherein K is a random number between 0 and $2^{M-1}$, being M the number of attempts made to transmit the data packet—before trying a new transmission which will be made only if the CARRIER_STATUS is set to CARRIER_OFF. Since the data module 2040 forces the CARRIER_STATUS to CARRIER_ON, the MAC module will not try a new transmission while the data module 2040 is in the COLLIDE state 405. Besides, since the data is guaranteed to be delivered at next transmit opportunity, M will always be equal to 1, which means that even in the worst case the MAC module is ready to transmit again before the current transmission (which is minimum 576 bits) is over.

The data module 2040 keeps the SIGNAL_STATUS to SIGNAL_ERROR until the MAC module understands that there's a collision state and sets the plca_txen parameter to FALSE, i.e. until the MAC module stops jamming and informs the RS module that there is no data to be transmitted. When the MAC layer sets the plca_txen parameter to FALSE, the data module 2040 moves to the PENDING state 406 therefore stopping to send a collision signal to the MAC (SIGNAL_STATUS is set to NO_SIGNAL_ERROR), but still maintaining the CARRIER_STATUS parameter to CARRIER_ON, therefore informing the MAC module that the medium is already taken and no transmission is possible.

While in the pending state, the data module 2040 waits for the control module 2050 to indicate that it is possible to transmit by setting the commit parameter to TRUE. When the commit parameter is set to TRUE, the finite state machine implemented by data module 2040 moves to the next state 407 (called WAIT_MAC) and sets the CARRIER_STATUS parameter to FALSE, therefore informing the MAC module that the medium is free and it is possible to transmit the data.

As provided by IEEE 802.3 standard, the MAC module waits for an inter-packet gap before transmitting the data. Inter-packet gap is a minimum pause required between transmission of two packets, e.g. 96 ns for Gigabit Ethernet and 9.6 us for 10 Mbit Ethernet. During this interframe gap, the control module 2050 sends the commit signal to the other devices of the network in order to inform their RS modules to move on the receive state 307 and stop TO_TIMER.

When the MAC module sends data to the RS module, data module 2040 senses the plca_txen parameter is set to TRUE and moves to the TRANSMIT state 403. Differently from the case described before, the buffer is free (the index 'a' is equal to zero), therefore at each MCD clock period, the data module receives four bits from the MAC module and transmits them to the MII, as indicated by arrow 4031.

When MAC module ends the transmission, and sets the plca_txen parameter to FALSE, the finite state machine implemented by data module 2040 moves back to the IDLE state 400, waiting for new data from the MAC module.

A last change of status of the FSM implemented by the data module is represented by arrow 4011. When the data module 2040 is in the RECEIVE state 401, the MAC module should not be transmitting because if data is received, the CARRIER_STATUS should be set to the value CARRIER_ON. Nevertheless, it could happen that in the same clock period that the MAC starts transmitting, the data exchange module 2000 starts receiving. In this case the sending data module generates a collision to stop MAC from sending data, therefore the finite state machine implemented by the data module 2040 moves to the COLLIDE state 405.

From the above, it is clear how the method described allows a deterministic and reliable transmission of data over an Ethernet network, increasing throughput and limiting the maximum latency with respect to the prior art methods.

FIGS. 8a-8d illustrate, for example, the result of the comparison between a TDMA system with one implementing the PLCA method above described. The tests have been carried out with devices transmitting packets of 1500 bytes of payload (FIGS. 8a-8b) and with packets of random size comprised between 60 bytes and 1500 bytes (FIGS. 8c-8d) of payload. All tests show that the method provides higher throughput and lower latency.

It is also clear that the invention is not limited to the specific embodiments described above and that modifications are possible to the person skilled in the art which falls within the scope of protection of the claims.

As an example, it is clear that the modules above described can be differently grouped or divided into different module which implements the same functions above described.

It is also clear that, certain features and functions above described as preferred but not essential to the invention, like buffering data received by the MAC module when no transmit opportunity is offered to the RS module, can be omitted. Synchronization of the RS modules can be obtained in several ways different from the one above described. As an example, instead of having an RS module sending a beacon signal, devices connected in the network can synchronize themselves at higher level in the OSI model, e.g. at application layer or at MAC layer, and then the circuitry implementing the higher layers can provide a clock signal to the RS modules, which therefore will be synchronized.

In one embodiment, the data exchange module generated the myID identifier by sensing how many devices are connected on the network by calculating how many transmission opportunities are offered between two consecutive beacon signals; a transmission opportunity being calculated by the data exchange module each time a valid data transmission is received on the medium, or each time no data is present on the medium for said predetermined time range. Preferably, in order to allow a device whose identifier is not yet assigned to join a network of N devices without disrupting other devices traffic, the master data exchange module is configured to leave one additional transmit opportunity in addition to those necessary for the N devices to transmit. The said additional transmit opportunity can be used by said device to send an enumeration request to the master data exchange module which upon, successful reception of the enumeration request, in turn increases by one unit a parameter MAX_ID indicating the number of devices connected in the network. In case more than one device at a time needs to join the network, it is possible for the enumeration request to collide with other enumeration requests. In this case the collision is detected and the involved devices will retry sending the enumeration request after a random time. This process converges after some iterations as in CSMA/CD backoff mechanism.

In one variant of the above described method, the RS module does not buffer data. This solution, which could cause a little bit higher latency and lower throughput, can be preferred in certain cases, e.g. to decrease the costs of the system when the number of devices sharing the same medium is high. In this variant when the data module 2040 is in IDLE state 400 and the access control module conveys data to the data exchange module (plca_txen=TRUE) the finite state machine implemented by the data module 2040 moves to the COLLIDE state 405 instead of the HOLD state 402. This prevents data from being buffered and always forces the access control module to backoff as in preferred embodiment. Data which has been delayed in said way will always be transmitted at the next transmit opportunity, however said unconditioned backoff results in added latency when no other devices use their respective transmit opportunity to send data on the medium.

In other words, in the above variant, each time a data exchange module receives data from the control access module it:
  stores an information that the access control module has data to be transmitted,
  transmits to the access control module an information that the same data is to be transmitted again at a later time, and
  then, upon detection that a new transmit opportunity is offered to said data exchange module, it transmits to the access control module an information that data can be transmitted.

The invention claimed is:

1. A method for avoiding collision over a communication network,
  wherein a plurality of devices is connected to one same medium for sending and receiving data,
    each device of said plurality of devices being provided with
      an access control module for controlling access of the device to the medium,
      a transceiver module for receiving and/or transmitting data over the medium, and
      a data exchange module for exchanging data between the access control module and the transceiver module,
    wherein the access control module is configured to transmit data to the data exchange module when it receives an information that no data is present on the medium, and wherein the transceiver module is configured to transmit data on the medium each time it receives data from the data exchange module, the method comprising:
  synchronizing the data exchange modules of all the devices,
  once the data exchange modules are synchronized, defining a predefined sequence, and cyclically offering, according to the predefined sequence, to each data exchange module an opportunity to transmit data on the medium, said opportunity to transmit being offered dynamically after a previous transmission ends or, if no transmission occurs, after a predetermined time range has expired, wherein said predetermined time range is a consistent time range,
  wherein each data exchange module transmits data to a respective transceiver module only when said data exchange module is offered said opportunity to transmit, while if a data exchange module receives a request for data transmission from the respective access control module when it has not been offered the opportunity to transmit, then the data exchange module delays data transmission to the transceiver module until the next opportunity to transmit is offered to the same data exchange module;
  wherein a data exchange module delays data transmission to the transceiver module by buffering the data received from the access control module;
  and if a data exchange module, while in the process of delaying data transmission, receives from the transceiver module an indication that valid data is received from the medium, the data exchange module:
  discards any buffered data received from the access control module,
  stores an information that the access control module has data to be transmitted,
  transmits to the access control module an information that data is present on the medium, and
  transmits to the access control module an information that said data is to be transmitted again at a later time,
  and wherein the data exchange module transmits to the access control module an information that no data is present on the medium when the data exchange module detects that it is its turn to transmit data;
  wherein synchronization of the data exchange modules of said plurality of devices comprises the following steps:
  a master data exchange module of said plurality of devices sends a 20-bit long beacon signal on the medium via its transceiver module;
  when the beacon signal ends, all data exchange modules of said plurality of devices start a transmit opportunity timer which counts said predetermined time range;
  and wherein
  each data exchange module of said plurality of devices is identified by an identifier, said identifier being an integer ranging from 0 to N−1 where N is the number of devices connected to the medium, wherein
  each data exchange module of said plurality of devices comprises a counter which is set to 0 when the beacon signal is received, and which is incremented after a previous transmission end or, if no transmission occurred, after said predetermined time range has expired, and wherein
  said opportunity to transmit is offered to the data exchange module whose identifier equals the value of the counter.

2. The method of claim 1, wherein a data exchange module receives data from the control access module and, in response to said reception:
- stores an information that the access control module has data to be transmitted,
- transmits to the access control module an information that the same data is to be transmitted again at a later time, and
- then, upon detection that a new transmit opportunity is offered to said data exchange module, it transmits to the access control module an information that data can be transmitted.

3. The method of claim 1, wherein the master data exchange module sends a beacon signal after no transmissions are ongoing on the medium for a certain amount of time and it receives from the transceiver module an indication that data being present on the medium are not valid data.

4. The method of claim 1, wherein the data exchange module having an identifier equal to zero is the master data exchange module, and wherein the master data exchange module reset said counter to zero each time it reaches the value N, and sends a beacon signal each time the counter is reset to zero.

5. The method of claim 4, wherein said identifier is generated by a management interface controlling the data exchange module.

6. The method of claim 4, wherein said identifier is generated automatically by each data exchange module by sensing on the network how many devices are connected.

7. The method of claim 6, wherein a data exchange module senses how many devices are connected on the network by calculating how many transmission opportunities are offered between two consecutive beacon signals, a transmission opportunity being calculated by the data exchange module each time a valid data transmission is received on the medium, or each time no data is present on the medium for said predetermined time range.

8. The method of claim 7, wherein the master exchange module reset said counter and sends the beacon signal after N+1 opportunities to transmit have been offered to the N data exchange modules connected to the network.

9. A device comprising:
- an access control module for controlling access of the device to the medium,
- a transceiver module for transmitting data over the medium, and
- a data exchange module operatively connected to the access control module and to the transceiver module for exchanging data between the access control module and the transceiver module,
- wherein the access control module is configured to transmit data to the data exchange module when it receives an information that no data is present on the medium, and wherein the transceiver module is configured to transmit data on the medium each time it receives data from the data exchange module,
- wherein the data exchange module is identified by a data exchange module identifier, comprises a transmit opportunity counter and a buffer, and is configured
- to increment the counter after receiving an indication that a data transmission of a data exchange module ahead of it in a predefined sequence has ended on the medium, or if no transmission occurred, after a predetermined time range has expired, wherein said predetermined time range is a consistent time range,
- for transmitting said data to be transmitted to the transceiver module only when the data exchange module identifier equals the value of the counter, and
- for buffering said data to be transmitted and delaying their transmission to the transceiver module until the value of the counter equals the data exchange module identifier.

10. The device of claim 9, wherein, in response to an indication from the transceiver module that valid data is received from the medium, the data exchange module is further configured to:
- discard any buffered data received from the access control module,
- store an information that the access control module comprises data to be transmitted,
- transmit to the access control module an information that data is present on the medium, and
- transmits to the access control module an information that the same data is to be transmitted again at a later time,
- and wherein the data exchange module is further configured to transmit to the access control module an information that no data is present on the medium when the data exchange module identifier equals the value of the counter.

11. The device of claim 9, wherein, in response to data received from the control access module, the data exchange module is configured:
- to store an information that the access control module has data to be transmitted,
- to transmit to the access control module a first piece of information that said data is to be transmitted again at a later time,
- upon detection that a new transmit opportunity is offered to said data exchange module, to transmit to the access control module an information that data can be transmitted.

* * * * *